Jan. 15, 1924.
R. M. LOVEJOY
1,480,624
SPRING CONSTRUCTION FOR VEHICLES
Filed Aug. 4, 1919
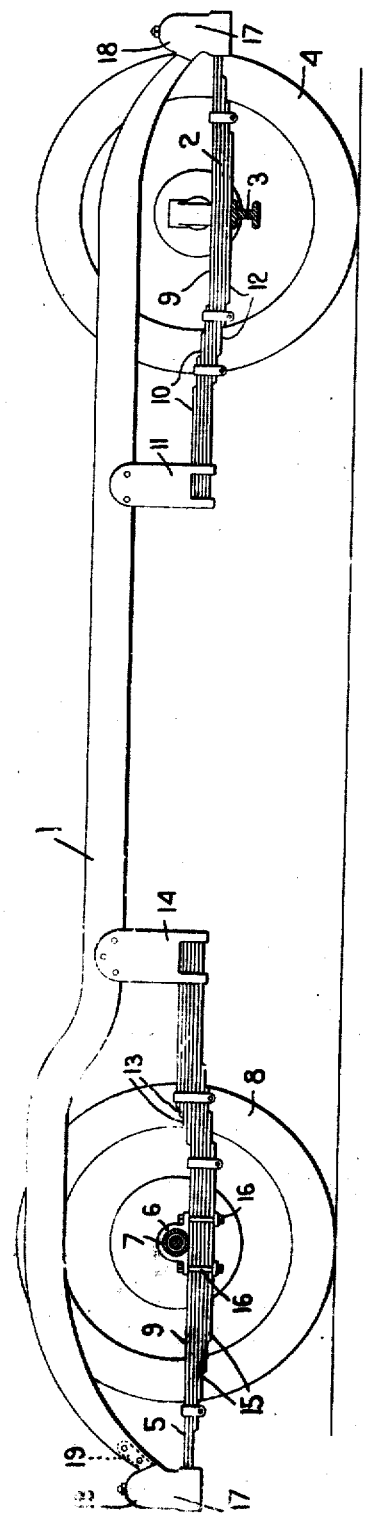
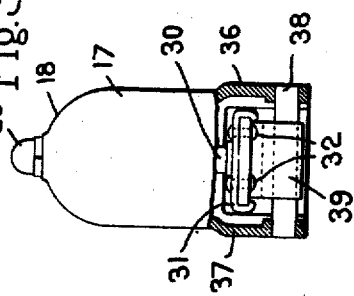
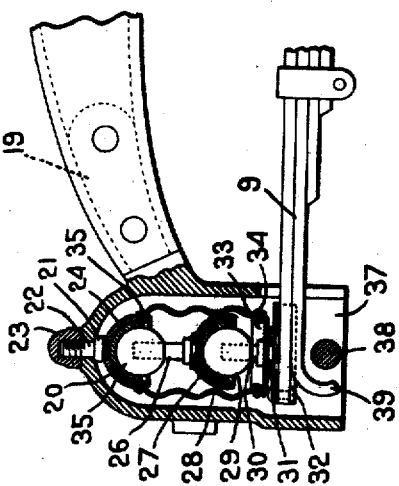
Inventor.
Ralph M. Lovejoy
by Heard Smith & Tennant
Attys Patented Jan. 15, 1924.

1,480,624

UNITED STATES PATENT OFFICE.

RALPH M. LOVEJOY, OF MEREDITH, NEW HAMPSHIRE.

SPRING CONSTRUCTION FOR VEHICLES.

Application filed August 4, 1919. Serial No. 315,051.

*To all whom it may concern:*

Be it known that I, RALPH M. LOVEJOY, a citizen of the United States, and resident of Meredith, county of Belknap, State of New Hampshire, have invented an Improvement in Spring Constructions for Vehicles, of which the following description, in connection with the accompanying drawing, is a specification, like characters on the drawing representing like parts.

This invention relates to improvements in spring constructions for vehicles and the object thereof is to provide a novel construction which comprises a spring rigidly anchored at one end to the frame and connected to the other end by a universal joint, the purpose of the construction being to increase the durability of the spring connections to the frame and to avoid the disagreeable rattling which results from the wearing of the shackles usually employed.

A further object of the invention is to provide an improved shackle comprising a plurality of universal joints.

A further feature of the invention consists in providing an ornamental housing for the spring shackle which is adapted to be secured to the frame of the vehicle and which will also act as an enclosure to prevent accumulation of dust upon the shackle.

A further feature of the invention consists in providing a shackle construction having one or more universal joints with means enclosing said joint or joints which will prevent the entry of dust into the shackle.

Other objects and features of the invention will more fully appear from the following description and the annexed drawings and will be pointed out in the accompanying claims.

A preferred embodiment of the invention is illustrated in the accompanying drawings, in which, Fig. 1 is a side elevation of a wheel-supported frame of an automobile illustrating the novel spring and shackle construction embodying my invention;

Fig. 2 is a detail view, partly in vertical section, of a shackle embodying the invention, connecting the end of the frame to the end of the spring; and, Fig. 3 is an end view of the housing, partly broken away to show the position of the spring and its connection to the shackle.

The present invention is illustrated as applied to an automobile chassis which comprises the usual side frames 1 which are provided with downwardly turned front ends connected to springs 2 which are supported upon an axle 3 connected by usual forms of steering knuckles to steering wheels 4. The rear end of the frame 1 likewise is bent downwardly at its end and is connected to the end of springs 5 which are connected to the housing 6 of the rear axle 7 upon which the traction wheels 8 are mounted.

In the construction illustrated herein the front and rear springs 2 and 5 are built-up leaf springs and are rigidly anchored at one end respectively to brackets depending from the frame and at the other end to the shackles forming part of my invention which will hereinafter be more fully described.

The front spring comprises one or more long leaves 9 having superimposed upon the rear end of the same a series of progressively shorter leaves 10. The rear end portion of this built-up construction is connected rigidly to a suitable bracket 11 which is rigidly connected to the frame. Progressively shorter leaves 12 are also secured to the under face of the long leaf 10 and at their central portion preferably rest upon the front axle 3 of the vehicle and are secured to it in any usual manner, not shown.

The rear spring 5, as illustrated herein, comprises two long leaves 9, upon the front end of the uppermost is supported a series of progressively shorter leaves 13 which are rigidly connected to a bracket 14 which is rigidly secured to the frame. A series of progressively shorter leaves 15 are secured to the intermediate portion of the lower long leaf and are secured at their middle portion by suitable clips 16 to the axle housing 6 in the usual manner. It will thus be noted that each of the springs is secured rigidly at one end to the frame and extends over a rigid support forwardly and rearwardly beneath and in longitudinal parallelism with the front and rear end portions of the frame. The otherwise free ends of the springs are connected to the frame by shackles which are provided with one or more universal joints preferably in the following manner. As each of these shackles may be of identical construction the description of one will suffice for all.

A housing 17, which for ornamental purposes may be of general cylindrical form, provided with a dome-shaped top 18, is provided with an arcuate extension 19 which is secured to the end of the frame 1.

The housing preferably supports a plurality of superimposed universal couplings, the lowermost of which is connected to the end of the spring. As illustrated in the accompanying drawing the upper universal coupling comprises a hemispherical cup 20 having a boss 21 resting on the under surface of the dome of the housing and provided with a stem 22 which extends through the upper end of the housing and is secured therein by a nut 23 which may be an acorn nut or any fanciful design.

Within the cup 20 is a layer 24 of antifriction material, which may be rawhide or brake lining material suitably soaked in oil, for either of these materials will stand long usage in such places without any material wear and without the necessity of frequent lubrication. A ball 25 which is seated in the cup 20 is provided with a downwardly extending stem 26 which at its lower end is connected to a second cup or socket 27 for another ball joint, which may be substantially identical with that above described, having a layer of anti-friction material 28 interposed between said cup and its ball 29. The ball 29 likewise is provided with a stem 30 which is secured to a plate 31 which desirably is formed in such a manner as to embrace the end or ends of the long leaf or leaves of the spring. The plate 31 may be secured to the spring by bolts or rivets 32 as illustrated in Fig. 2.

A cup-shaped member 33 desirably is secured to the plate 31 and the upwardly extending flange thereof is provided with a groove into which the lower end of a boot of leather or other flexible material may be clamped by a suitable ring 34. The upper end of the boot may be secured by a band or ring 35 against an annular groove in the lower portion of the upper cup-shaped member 20. Thus the entire system or series of universal bearings or ball joints of the spring shackle are completely protected from dust.

The lower portion of the housing desirably is enlarged to form a rectangular section, the walls 36 and 37 thereof being spaced apart a sufficient distance to avoid contact with the sides of the spring during the lateral movement thereof which is caused by the torsional strain imposed upon the spring as the opposite wheels are unequally raised or lowered. The lower portion of the housing is also of a sufficient size to permit free forward and backward movement of the spring relatively to the frame.

In order to limit the relative longitudinal movement of the frame and spring in cases of unusual shock or accident a shaft 38 extends transversely of the lower central portion of the enlarged section of the housing, said shaft being in the path of the downturned end 39 of the long leaf of the spring or the lower long leaf of the spring when more than one long leaf extends into the housing.

By reason of the construction described the frame of the vehicle is supported upon compression members embodying universal joints both at the front and rear ends. These universal connections permit flexure of the spring both vertically and transversely and are at all times noiseless. The rigid connection of the springs to the axles and to the frame serves always to avoid the rattling which occurs in usual spring constructions in which such ends are connected by links or other connections which are likely to wear and after such wearing to rattle by reason of the vibration between the springs and the frame. The universal couplings between the spring and the frame, being of the compression type, are always retained in contact by the weight of the vehicle upon the spring so that no rattling occurs. Furthermore, connections of this character are not subject to breakage such as frequently occurs in shackle constructions in which the frames and springs are connected by links.

It will be understood that the embodiment of the invention disclosed herein is of an illustrative character and is not restrictive and that various modifications may be made within the spirit and scope of the following claims.

Having thus described my invention, what I claim as new, and desire to secure by Letters Patent, is:

1. In combination with a vehicle comprising a frame and an axle, a spring comprising a long leaf having superimposed upon one end a plurality of progressively shorter leaves rigidly secured together and to the frame and upon the opposite side of the leaf intermediate of its ends a series of progressively shorter leaves secured together and to said axle and means including a universal joint connecting the other end of said long leaf to the end of the frame.

2. In combination with a vehicle comprising a frame and an axle, a spring comprising a long leaf having superimposed upon one end a plurality of progressively shorter leaves rigidly secured together and to the frame and upon the opposite side of the leaf intermediate of its ends a series of progressively shorter leaves secured together and to said axle and means including a plurality of universal joints connecting the other end of said long leaf to the end of the frame.

3. In combination with a vehicle comprising a frame and an axle, a leaf spring connected intermediate of its ends to said axle, means connecting one end of said spring rigidly and inflexibly to said frame and means including a universal joint connecting the other end of said spring to the end of the frame.

4. In combination with a vehicle comprising a frame and an axle, a leaf spring connected intermediate of its ends to said axle, means connecting one end of said spring rigidly and inflexibly to said frame and means including a plurality of universal joints connecting the other end of said spring to the end of the frame.

5. In combination with a vehicle comprising a frame and an axle, a leaf spring connected intermediate of its ends to said axle, means connecting one end of said spring rigidly and inflexibly to said frame and means including compression members joined by a plurality of ball and socket joints connecting the other end of said spring to the end of the frame.

6. A shackle comprising a housing adapted to be secured to the frame of a vehicle, means for connecting said housing to the end of a spring including a plurality of members within said housing, connected by a plurality of universal joints, the wall of the housing having a spring-receiving opening of sufficient width to prevent contact of its walls with the spring when the latter is subject to usual torsional strains by unequal movements of the wheels of the vehicle.

7. A shackle comprising a housing adapted to be secured to the frame of a vehicle, means for connecting said housing to the end of a spring including a plurality of members within said housing having ball and socket connections with each other, and a spheroidal anti-friction lining seated in each of said ball-receiving sockets.

8. A shackle comprising a dome-shaped housing having an extension adapted to be secured to the frame of a vehicle, a socket member detachably connected to the dome of the housing, a ball member engaging said socket and having a stem provided with a socket, a ball engaging the latter socket and means for connecting said second ball to the end of a spring.

9. A shackle comprising a dome-shaped housing having an extension adapted to be secured to the frame of a vehicle, a socket member detachably connected to the dome of the housing, a ball member engaging said socket and having a stem provided with a socket, a ball engaging the latter socket and means for connecting said second ball to the end of a spring and a boot enclosing said ball and socket connections.

10. A shackle comprising a housing adapted to be secured to the frame of a vehicle, means for connecting said housing to the end of a spring including a universal joint, the wall of the housing having a spring-receiving opening and a shaft extending transversely of the lower portion of said housing adapted to be engaged by the downturned end of the spring and thereby to limit an abnormal longitudinal movement of the spring.

In testimony whereof, I have signed my name to this specification.

RALPH M. LOVEJOY.